(12) United States Patent
Nishijima et al.

(10) Patent No.: US 7,870,758 B2
(45) Date of Patent: Jan. 18, 2011

(54) EJECTOR CYCLE

(75) Inventors: Haruyuki Nishijima, Obu (JP); Hisatsugu Matsunaga, Anjo (JP); Tooru Ikemoto, Chiryu (JP); Hirotsugu Takeuchi, Nagoya (JP)

(73) Assignee: Denso Corporation, Kariya (JP)

( * ) Notice: Subject to any disclaimer, the term of this patent is extended or adjusted under 35 U.S.C. 154(b) by 707 days.

(21) Appl. No.: 10/880,046

(22) Filed: Jun. 29, 2004

(65) Prior Publication Data

US 2004/0261448 A1    Dec. 30, 2004

(30) Foreign Application Priority Data

Jun. 30, 2003    (JP)    ............................. 2003-186602

(51) Int. Cl.
*F25B 1/06*    (2006.01)
(52) U.S. Cl. ............................. 62/500; 62/116; 62/197; 62/509
(58) Field of Classification Search .................. 62/500, 62/180, 186, 116, 197, 509
See application file for complete search history.

(56) References Cited

U.S. PATENT DOCUMENTS 5,444,987 A * 8/1995 Alsenz ........................ 62/116
6,477,857 B2 * 11/2002 Takeuchi et al. .............. 62/500
6,705,094 B2 * 3/2004 Alsenz ......................... 62/116
6,729,157 B2 * 5/2004 Oshitani et al. ............... 62/500
2003/0213264 A1 * 11/2003 Ogata et al. ................... 62/500

FOREIGN PATENT DOCUMENTS

JP    6-11197    1/1994

OTHER PUBLICATIONS

Jones et. al., "Engineering Thermodynamics", Prentice Hall, Englewood Cliffs, New Jersey, pp. 90-101, 1996.*

* cited by examiner

*Primary Examiner*—Emily Nalven
*Assistant Examiner*—Azim Rahim
(74) *Attorney, Agent, or Firm*—Harness, Dickey & Pierce, PLC

(57) ABSTRACT

In an ejector cycle with an ejector including a nozzle for decompressing refrigerant, a control unit controls an air blowing amount of an evaporator fan so that a flow speed of refrigerant flowing in an evaporator becomes in a predetermined flow speed range. Therefore, it can prevent a large amount of lubrication oil from staying in the evaporator, and thereby the lubrication oil can sufficiently returns to a compressor. For example, the control unit includes a determining means for determining the predetermined flow speed range based on at least one of an atmosphere temperature of a condenser, a temperature of air supplied to the evaporator and a flow amount of refrigerant discharged from the compressor.

16 Claims, 8 Drawing Sheets

EJECTOR CYCLE

CROSS-REFERENCE TO RELATED APPLICATION

This application is related to and claims priority from Japanese Patent Application No. 2003-186602 filed on Jun. 30, 2003, the contents of which are hereby incorporated by reference.

BACKGROUND OF THE INVENTION

1. Field of the Invention

The present invention relates to an ejector cycle including an ejector, and a control method for controlling the ejector cycle.

2. Description of Related Art

In an ejector cycle described in JP-A-6-11197, refrigerant is decompressed and expanded in a nozzle of an ejector so that gas refrigerant evaporated in an evaporator is sucked, and pressure of refrigerant to be sucked into a compressor is increased by converting expansion energy to pressure energy. In the ejector cycle, refrigerant discharged from the compressor is circulated to a condenser (radiator) so as to radiate heat absorbed in the evaporator. The refrigerant cooled in the condenser is decompressed and expanded in a nozzle in isoenthalpy, and refrigerant evaporated in the evaporator is drawn into the ejector by pumping operation due to entrainment of high-speed refrigerant jetted from the nozzle. That is, by the pumping operation generated in the ejector, low-pressure side refrigerant circulates a gas-liquid separator→the evaporator→the ejector→the gas-liquid separator, in this order. Accordingly, in the ejector cycle, a force for circulating the low-pressure side refrigerant is small, as compared with a general vapor-compression refrigerant cycle where the low-pressure side refrigerant is directly drawn by the compressor.

Further, in an ejector cycle where an evaporation temperature becomes extremely low, viscosity degree of oil (lubrication oil) mixed in refrigerant becomes larger, and the lubrication oil may stay in the evaporator. In this case, a sufficient amount of the lubrication oil cannot be returned to the compressor, and burning of the compressor may be caused. Hear, the lubrication oil is used for lubricating a sliding portion in the compressor, and is drawn into the compressor together with the refrigerant.

SUMMARY OF THE INVENTION

In view of the foregoing problems, it is an object of the present invention to provide an ejector cycle having an ejector, which prevents a trouble of a compressor due to an insufficient amount of lubrication oil.

According to an aspect of the present invention, an ejector cycle includes a compressor for drawing and compressing refrigerant, a high-pressure heat exchanger for cooling high-pressure refrigerant discharged from the compressor, a low-pressure heat exchanger for evaporating low-pressure refrigerant after being decompressed, an ejector, and a gas-liquid separator for separating refrigerant from the ejector into gas refrigerant and liquid refrigerant. The ejector includes a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger. In the ejector cycle, a blower for blowing air to the low-pressure heat exchanger is disposed, and a control unit controls an air blowing amount of the blower such that a flow speed of refrigerant flowing in the low-pressure heat exchanger becomes in a predetermined flow speed range.

Alternatively, the ejector cycle includes a variable throttle device disposed at a refrigerant outlet side of the high-pressure heat exchanger to decompress refrigerant from the high-pressure heat exchanger before flowing into the nozzle 41, a bypass passage through which at least a part of refrigerant flowing out of the high-pressure heat exchanger is introduced to the nozzle while bypassing the variable throttle device, and a valve device which opens and closes the bypass passage. In this case, a control unit controls switching operation of the valve device so that the flow speed of refrigerant flowing in the low-pressure heat exchanger becomes in a predetermined flow speed range. Alternatively, a control unit controls a throttle open degree of the nozzle so that the flow speed of refrigerant flowing in the low-pressure heat exchanger becomes in a predetermined flow speed range. Alternatively, the ejector cycle includes a bypass passage through which at least a part of the high-pressure refrigerant discharged from the compressor is introduced to the low-pressure heat exchanger while bypassing the high-pressure heat exchanger and the nozzle, and a valve device which opens and closes the bypass passage. In this case, a control unit controls switching operation of the valve device so that the flow speed of refrigerant flowing in the low-pressure heat exchanger becomes in a predetermined flow speed range.

Accordingly, the flow speed of refrigerant flowing in the evaporator can be controlled to become in the predetermined flow speed range. Therefore, it can prevent a large amount of lubrication oil from staying in the low-pressure heat exchanger (evaporator). As a result, a sufficient amount of lubrication oil can be returned to the compressor in the ejector cycle, and it can prevent the compressor from being burned due to an insufficient supply of the lubrication oil.

Preferably, a temperature detecting sensor is disposed for detecting a temperature relating to a refrigerant temperature in the low-pressure heat exchanger, and the control unit controls the air blowing amount of the blower when the temperature detected by the temperature detecting sensor is lower than a predetermined temperature. Therefore, the flow speed of refrigerant in the low-pressure heat exchanger can be effectively controlled. For example, the temperature detecting sensor detects a surface temperature of the low-pressure heat exchanger, an air temperature blown out of the low-pressure heat exchanger, relative to the refrigerant temperature in the low-pressure heat exchanger. Alternatively, the temperature detecting sensor can directly detect the refrigerant temperature in the low-pressure heat exchanger.

In the present invention, the predetermined flow speed range can be determined based on at least one of the temperature of refrigerant flowing in the low-pressure heat exchanger, an atmosphere temperature of the high-pressure heat exchanger, a temperature of air to be introduced to the low-pressure heat exchanger, and a flow amount of refrigerant discharged from the compressor.

According to another aspect of the present invention, a control method (program) for controlling operation of an ejector cycle includes: detecting a flow speed of refrigerant flowing in a low-pressure heat exchanger; determining a target flow speed range of refrigerant flowing in a low-pressure heat exchanger; and controlling the flow speed of the refrigerant flowing in the low-pressure heat exchanger to be in the target flow speed range. Specifically, in the controlling, an air blowing amount of a blower for blowing air to the low-pressure heat exchanger is controlled such that the flow speed of the refrigerant flowing in the low-pressure heat exchanger becomes in the target flow speed range. Accordingly, the flow speed of refrigerant flowing in the evaporator can be controlled to become in the predetermined flow speed range. Therefore, it can prevent large amount of lubrication oil from staying in the low-pressure heat exchanger (evaporator).

Alternatively, the ejector cycle includes a variable throttle device disposed at a refrigerant outlet side of a high-pressure heat exchanger to decompress refrigerant before flowing into a nozzle of an ejector, and a valve device for opening and closing a bypass passage through which at least a part of refrigerant flowing out of the high-pressure heat exchanger is introduced to the nozzle while bypassing the variable throttle device. In this case, switching operation of the valve device is controlled in the controlling such that the flow speed of the refrigerant flowing in the low-pressure heat exchanger becomes in the target flow speed range.

Alternatively, the ejector cycle includes a valve device for opening and closing a bypass passage through which at least a part of high-pressure refrigerant discharged from a compressor is introduced to the low-pressure heat exchanger while bypassing a high-pressure heat exchanger and a nozzle of an ejector. In this case, switching operation of the valve device is controlled in the controlling, such that the flow speed of the refrigerant flowing in the low-pressure heat exchanger becomes in the target flow speed range.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

First Embodiment

In the first embodiment, an ejector cycle is typically used as a vapor compression refrigerator for a showcase for cooling and refrigerating foods and drinks or as a vapor compression refrigerator mounted in a vehicle for transporting foods and drinks while keeping at a cooling or refrigerating state. In those vapor compression refrigerators, an evaporation temperature generally needs to set lower than that of a vapor-compression refrigerant cycle for an air conditioner.

Figure 1:
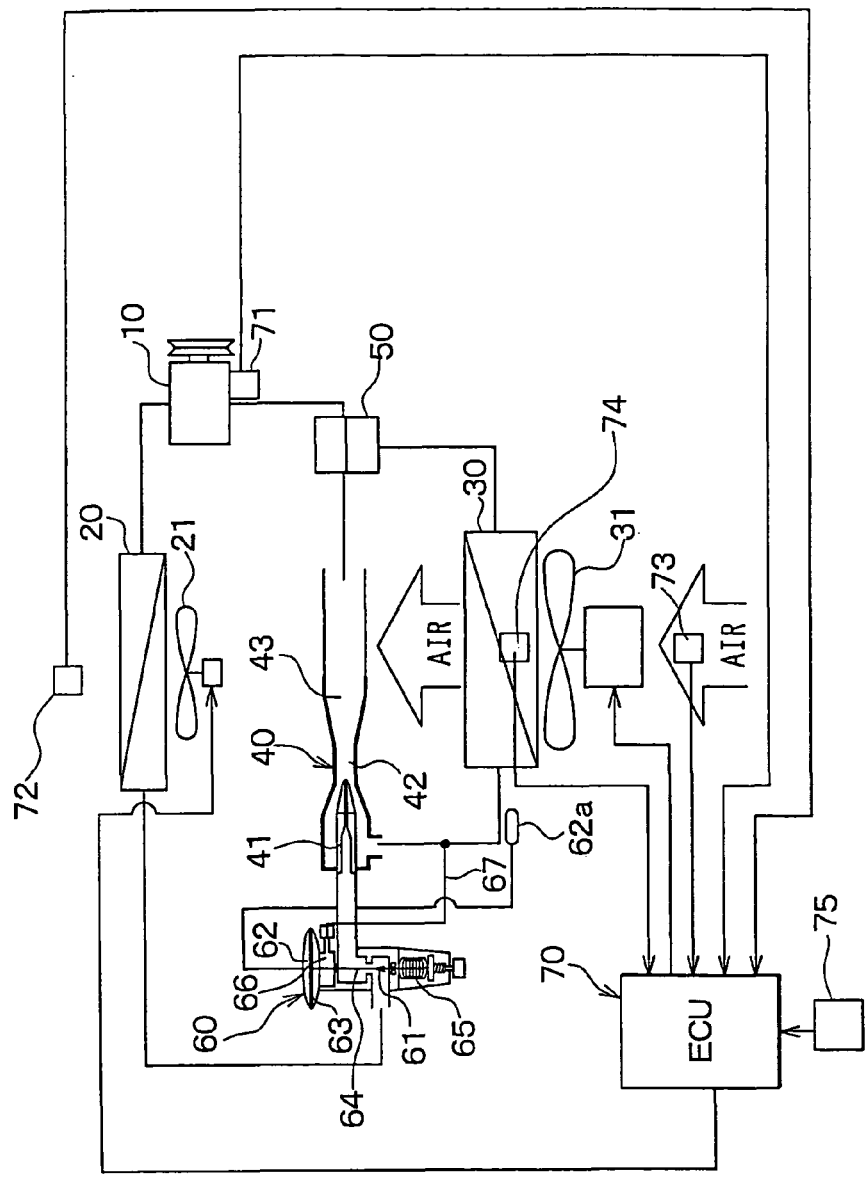
FIG. 1 is a schematic diagram showing an ejector cycle according to a first preferred embodiment of the present invention.

In the ejector cycle of FIG. 1, a compressor 10 is an electric compressor or a compressor driven by a vehicle engine, for sucking and compressing refrigerant circulated in the ejector cycle. A condenser 20 (cooler, radiator) is a high-pressure heat exchanger for cooling high-temperature and high-pressure refrigerant discharged from the compressor 10 by performing heat-exchange operation between outside air and the high-temperature and high-pressure refrigerant. A condenser fan 21 is an electrical blower for blowing outside air (cooling medium, cooling air) to the condenser 20.

Further, an evaporator 30 is a low-pressure heat exchanger for cooling air to be blown into a compartment such as the showcase by evaporating liquid refrigerant, more specifically, by performing heat-exchange operation between the air and low-pressure refrigerant. An evaporator fan 31 is an electrical blower for blowing air to the evaporator 30 and for blowing the cooled air into a compartment (showcase).

An ejector 40 sucks refrigerant evaporated in the evaporator 30 while decompressing and expanding refrigerant flowing out of the condenser 20 in a nozzle 41, and increases pressure of refrigerant to be sucked into the compressor 10 by converting expansion energy to pressure energy.

The ejector 40 includes the nozzle 41, a mixing portion 42, and a diffuser 43. The nozzle 41 decompresses and expands high-pressure refrigerant flowing into the ejector 40 in iso-enthalpy by converting pressure energy of the high-pressure refrigerant from the condenser 20 to speed energy thereof. The mixing portion 42 sucks refrigerant evaporated in the evaporator 30 by using an entrainment function of high-speed refrigerant stream jetted from the nozzle 41, and mixes the sucked refrigerant and the refrigerant jetted from the nozzle 41. Further, the diffuser 43 mixes the refrigerant injected from the nozzle 41 and the refrigerant sucked from the evaporator 30, and increases the refrigerant pressure by converting speed energy of the mixed refrigerant to pressure energy thereof.

In the mixing portion 42, a drive stream of refrigerant from the nozzle 41 and a suction stream of the refrigerant from the evaporator 30 are mixed so that their momentum sum is conserved, thereby increasing refrigerant pressure. In the diffuser 43, because a refrigerant passage sectional area gradually increases toward its outlet side, the refrigerant speed energy (dynamic pressure) is converted to refrigerant pressure energy (static pressure). Thus, in the ejector 40, refrigerant pressure is increased by both of the mixing portion 42 and the diffuser 43. Accordingly, in the ejector 40, a pressure-increasing portion is constructed with the mixing portion 42 and the diffuser 43.

In the first embodiment, "Laval nozzle" (refer to Fluid Engineering published by Tokyo University Publication) is adopted as the nozzle 41 to accelerate refrigerant injected from the nozzle 41 equal to or higher than the sound velocity. Here, the Laval nozzle 41 includes a throttle having the smallest passage area in its refrigerant passage. However, a nozzle tapered toward its outlet side can be used as the nozzle 41.

In FIG. 1, refrigerant is discharged from the ejector 40, and flows into a gas-liquid separator 50. The gas-liquid separator 50 separates the refrigerant from the ejector 40 into gas refrigerant and liquid refrigerant, and stores the separated gas refrigerant and the separated liquid refrigerant therein. The gas-liquid separator 50 includes a gas-refrigerant outlet connected to a suction port of the compressor 10, and a liquid-refrigerant outlet connected to a refrigerant inlet side of the evaporator 30. Accordingly, in the ejector cycle, liquid refrigerant from the gas-liquid separator 50 flows into the evaporator 30 while refrigerant from the condenser 20 is decompressed in the nozzle 41 of the ejector 40.

A variable throttle device 60 is disposed in a refrigerant passage between the condenser 20 and the nozzle 41 of the ejector 40. The variable throttle device 60 is an expansion valve disposed upstream from the nozzle 41 of the ejector 40, which decompresses high-pressure refrigerant flowing from the condenser 20 to a gas-liquid two-phase state. The variable throttle device 60 controls its throttle open degree so that a super-heating degree of refrigerant at a refrigerant outlet side of the evaporator 30 becomes in a predetermined range (e.g., 0.1-10 degrees).

Specifically, the variable throttle device 60 includes a valve body 61 for changing a throttle open degree, a thin film diaphragm 63, a connection rod 64, a spring 65 and an outer pipe 67. The thin film diaphragm 63 is constructed to define a back pressure chamber 62 having an inner pressure that changes by sensing a refrigerant temperature at a refrigerant outlet side of the evaporator 30, a pressure chamber 66 opposite to the back pressure chamber 62 with respect to the diaphragm 63. The connection rod 64 is connected to the valve body 61 and the diaphragm 63 so that a displacement of the diaphragm 63 is transmitted to the valve body 61. The spring 65 is biased so that its spring force is applied to the valve body 61 in a direction where the volume of the back pressure chamber 62 is reduced. The outer pipe 67 is a pressure introducing means for introducing a refrigerant pressure at the refrigerant outlet side of the evaporator 30 to the pressure chamber 66 opposite to the back pressure chamber 62 with respect to the diaphragm 63.

The back pressure chamber 62 communicates with a temperature sensing portion 62*a* that senses a refrigerant temperature at the refrigerant outlet side of the evaporator 30, so that the refrigerant temperature at the refrigerant outlet side of the evaporator 30 is transmitted to the back pressure chamber 62 through the temperature sensing portion 62*a*.

In this embodiment, the valve body 61, the diaphragm 63 and the connection rod 64 are made of metal such stainless steel, and a valve case member for forming the back pressure chamber or the pressure chamber 66 is made of metal such as aluminum, for example. Further, an adjustment screw is disposed to absorb a manufacturing difference of the variable throttle device 60, and to adjust the spring force to be applied to the diaphragm 63 so that a refrigerant super-heating degree at the refrigerant outlet side of the evaporator 30 becomes in a predetermined range.

For example, when the pressure in the evaporator 30, that is, the thermal load in the evaporator 30 becomes higher so that the refrigerant super-heating degree at the refrigerant outlet side of the evaporator 30 becomes higher, the throttle open degree of the variable throttle device 60 is made smaller. In this case, a flow speed of refrigerant (drive flow) jetted from the nozzle 41 is increased, and thereby increasing an amount of refrigerant (suction-flow refrigerant) circulating in the evaporator 30. Conversely, when the pressure in the evaporator 30, that is, the thermal load in the evaporator 30 becomes lower so that the refrigerant super-heating degree at the outlet side of the evaporator 30 becomes lower, the throttle open degree of the variable throttle device 60 is made larger. In this case, a flow speed of refrigerant (drive flow) jetted from the nozzle 41 is decreased, and thereby decreasing the amount of refrigerant (suction-flow refrigerant) circulating in the evaporator 30.

A rotation speed detection sensor 71 is disposed to detect a rotation speed of the compressor 10. Generally, a flow amount of refrigerant discharged from the compressor 10 is changed in accordance with the rotation speed of the compressor 10. Therefore, the flow amount of refrigerant discharged from the compressor 10 can be determined by the rotation speed of the compressor 10. An outside air temperature sensor 72 detects a temperature of outside air (cooling air) to be blown to the condenser 20. That is, the outside air temperature 72 detects the temperature of the atmosphere of the condenser 20. An inside air temperature sensor 73 detects an air temperature to be supplied to the evaporator 30, that is, detects temperature inside a compartment (showcase). An evaporator sensor 74 detects a refrigerant temperature (evaporator temperature) in the evaporator 30 by detecting an air temperature immediately after passing through the evaporator 30 or by detecting a surface temperature of the evaporator 30. A control panel 75 is provided with a start switch (main switch) of the ejector cycle and a setting switch for setting a control temperature in the compartment. Detection signals of the sensors 71-74 and signals from the control panel 75 are input to an electronic control device 70 (ECU).

The electronic control unit 70 is a computer constructed with a nonvolatile storage device such as a ROM or an HDD, a RAM and CPU. The electronic control unit 70 controls components such as the compressor 10, the condenser fan 21 and the evaporator fan 31 based on the detection values of the sensors 71-74 in accordance with a predetermined program stored in the nonvolatile storage device.

Next, operation of the ejector cycle according to the first embodiment will be now described.

As shown in FIG. 1, refrigerant discharged from the compressor 10 circulates toward the condenser 20. Then, high-pressure refrigerant from the compressor 10 is cooled in the condenser 20 and is decompressed in the variable throttle device 60 in iso-enthalpy to a gas-liquid two-phase state. Thereafter, refrigerant from the variable throttle device 60 is further decompressed in the nozzle 41 of the ejector 40 in iso-enthalpy, so that the refrigerant speed at the outlet of the nozzle 41 of the ejector 40 becomes equal to or higher than the speed of the sound. Thereafter, refrigerant from the outlet of the nozzle 41 flows into the mixing portion 42 of the ejector 40.

Refrigerant flowing into the variable throttle device 60 is decompressed by the variable throttle device 60 so as to boil once at an inlet side of the nozzle 41. Therefore, bubbles are generated by the variable throttle device 60, and boiling cores are generated after the bubbles disappear at the inlet side of the nozzle 41. Refrigerant with the boiling cores is further boiled by the nozzle 41, so that fine liquid drops (i.e., minute liquid drops) of refrigerant are generated. Because the boiling of refrigerant is facilitated in the nozzle 41, the generation of minute liquid drops of the refrigerant can be facilitated in the nozzle 41. Accordingly, the nozzle efficiency can be effectively improved.

In the first embodiment, freon is used as the refrigerant so that a refrigerant pressure at the high pressure side is lower than the critical pressure of the refrigerant. Therefore, the refrigerant pressure flowing into the nozzle 41 is lower than the critical pressure of the refrigerant.

The mixing portion 42 sucks refrigerant evaporated in the evaporator 30 by pumping operation due to the entrainment function of high-speed refrigerant stream injected from the nozzle 41, and mixes the sucked refrigerant and the injected refrigerant therein. Further, the diffuser 43 mixes the refrigerant injected from the nozzle 41 and the refrigerant sucked from the refrigerant outlet 30*b* of the evaporator 30, and increases the refrigerant pressure. Therefore, the ejector efficiency can be improved. Accordingly, low-pressure refrigerant in the gas-liquid separator 50 circulates the evaporator 30 and the pressure increasing portion of the ejector 40, in this order, and returns to the gas-liquid separator 50.

In this embodiment, an air blowing amount of the evaporator fan 31 is controlled so that a flow speed of refrigerant flowing in the evaporator 30 becomes in a predetermined flow speed range. Generally, the refrigerant flow speed in the evaporator 30 has a relationship with the refrigerant temperature in the evaporator 30, and it is difficult to directly detect the refrigerant flow speed in the evaporator 30. Accordingly, in the first embodiment, the air blowing amount of the evaporator fan 31 is controlled so that the refrigerant temperature inside the evaporator 30 becomes in a predetermined range.

Next, a control operation of the evaporator fan 31 will be now described with reference to FIG. 2. The flow diagram of the control program shown in FIG. 2 starts when a main switch (start switch) of the control panel 75 is turned on, and the flow diagram of the control program shown in FIG. 2 stops when the main switch (start switch) of the control panel 75 is turned off. At step S1, the condenser fan 21 is operated to blow air toward the condenser 20 by a predetermined air amount (normal capacity, normal output). That is, a voltage applied to the motor of the condenser fan 21 is set at a normal value.

At step S2, it is determined whether or not the main switch of the control panel 75 is turned on. When the main switch of the control panel 75 is turned on at step S2, the temperature (TAM) detected by the outside air temperature sensor 72 is input at step S3. That is, the temperature of cooling air (outside air) blown by the condenser fan 21 is detected by the sensor 72 as the atmosphere temperature of the condenser 20, and is input to the electronic control unit 70.

At step S4, the rotation speed (NC) of the compressor 10, detected by the rotation speed sensor 71, is input. Then, the air temperature (TD) detected by the inside air temperature sensor 73, to be sucked to the evaporator 30, is input at step S5, and the evaporator refrigerant temperature (TE) detected by the evaporator sensor 74 is input at step S6.

Next, the target evaporator refrigerant temperature range TEO (predetermined flow speed range) is determined based on at least one of the atmosphere temperature (i.e., outside air temperature TAM) of the condenser 20, the temperature (TD) of air blown to the evaporator 30, and a flow amount (i.e., rotation speed NC of the compressor 10) of refrigerant discharged from the compressor 10. For example, at step S7, the target evaporator refrigerant temperature range TEO is determined by using the input outside air temperature TAM and the rotation speed NC of the compressor 10 in accordance with a control map stored in the nonvolatile storage device of the electronic control unit 70. The detail determination of the target evaporator refrigerant temperature range TEO will be described later.

Then, at step S8, it is determined whether or not the evaporator refrigerant temperature TE is in the target evaporator refrigerant temperature range TEO (target range). When the evaporator refrigerant temperature TE is within the target evaporator refrigerant temperature range TEO, the air blowing amount to the evaporator fan 31, that is, the voltage applied to the electrical motor for driving the evaporator fan 31 is maintained at step S10. When the evaporator refrigerant temperature TE is outside the target evaporator refrigerant temperature range TEO, the air blowing amount to the evaporator fan 31, that is, the voltage applied to the electrical motor for driving the evaporator fan 31 is controlled so that evaporator refrigerant temperature TE becomes within the target evaporator refrigerant temperature range TEO, at step S9 and S11. Specifically, when the evaporator refrigerant temperature TE is lower than the lower limit of the target evaporator refrigerant temperature range TEO, that is, when the evaporator refrigerant temperature TE is in the range B on the graph at step S7, the air amount blown by the evaporator fan 31 is increased at step S11. In this case, heat quantity to be applied to the evaporator 30 is increased, the evaporation pressure inside the evaporator 30 is increased, and the evaporator refrigerant temperature TE is increased. In contrast, when the evaporator refrigerant temperature TE is higher than the upper limit of the target evaporator refrigerant temperature range TEO, that is, when the evaporator refrigerant temperature TE is in the range A on the graph at step S7, the air amount blown by the evaporator fan 31 is decreased at step S11. In this case, heat quantity to be applied to the evaporator 30 is decreased, the evaporation pressure inside the evaporator 30 is decreased, and the evaporator refrigerant temperature TE is decreased.

When the main switch of the control panel 75 is turned OFF at step S2, the compressor 10 is stopped and the evaporator fan 31 is stopped, at step S12. In the example of the control operation of FIG. 2, the flow speed of refrigerant flowing in the evaporator 30 is controlled to be in the predetermined flow speed range by controlling the refrigerant temperature TE in the evaporator 30.

Figure 3:
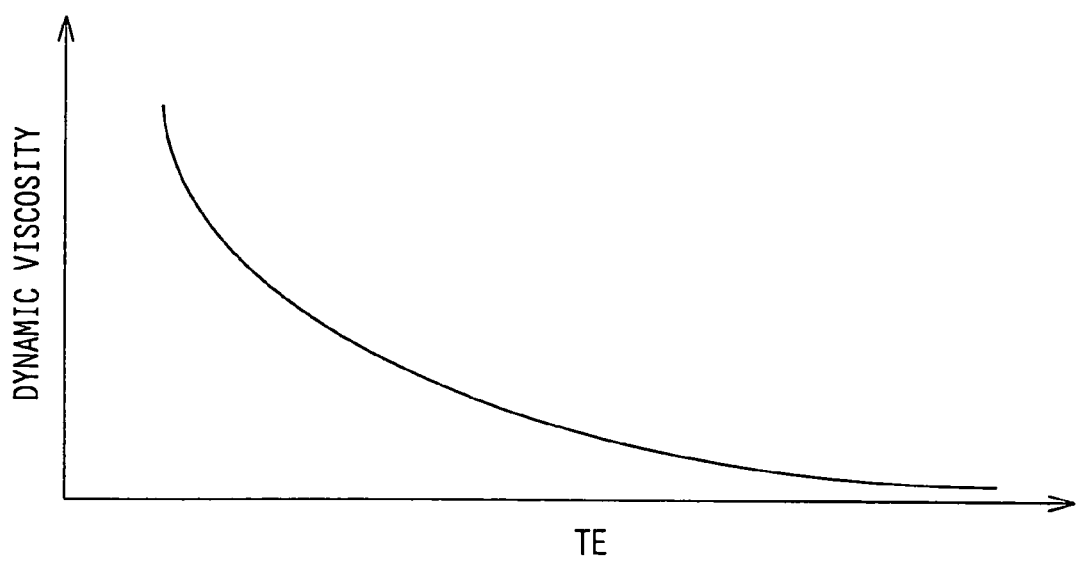
FIG. 3 is a graph showing a relationship between an evaporator temperature TE and a coefficient of dynamic viscosity of lubrication oil according to the first embodiment.

FIG. 3 is a graph showing the relationship between a dynamic viscosity coefficient of lubrication oil (refrigerating oil) in the evaporator 30 and an evaporator refrigerant temperature TE. As shown in FIG. 3, the dynamic viscosity coefficient of the lubrication oil in the evaporator 30 becomes larger in accordance with a decrease of the refrigerant temperature TE in the evaporator 30. That is, the dynamic viscosity coefficient of the lubrication oil in the evaporator 30 becomes larger in accordance with a decrease of the refrigerant evaporation pressure in the evaporator 30. Accordingly, the lubrication oil readily stays in the evaporator 30 as the evaporation refrigerant temperature decreases or as the refrigerant evaporation pressure in the evaporator 30 decreases.

The flow speed of refrigerant flowing in the evaporator 30 increases in accordance with the temperature increase in the evaporator 30. Generally, the flow speed of the refrigerant flowing in the evaporator 30 is uniquely determined when the temperature of the evaporator 30 such as the refrigerant temperature TE determines.

Figure 4:
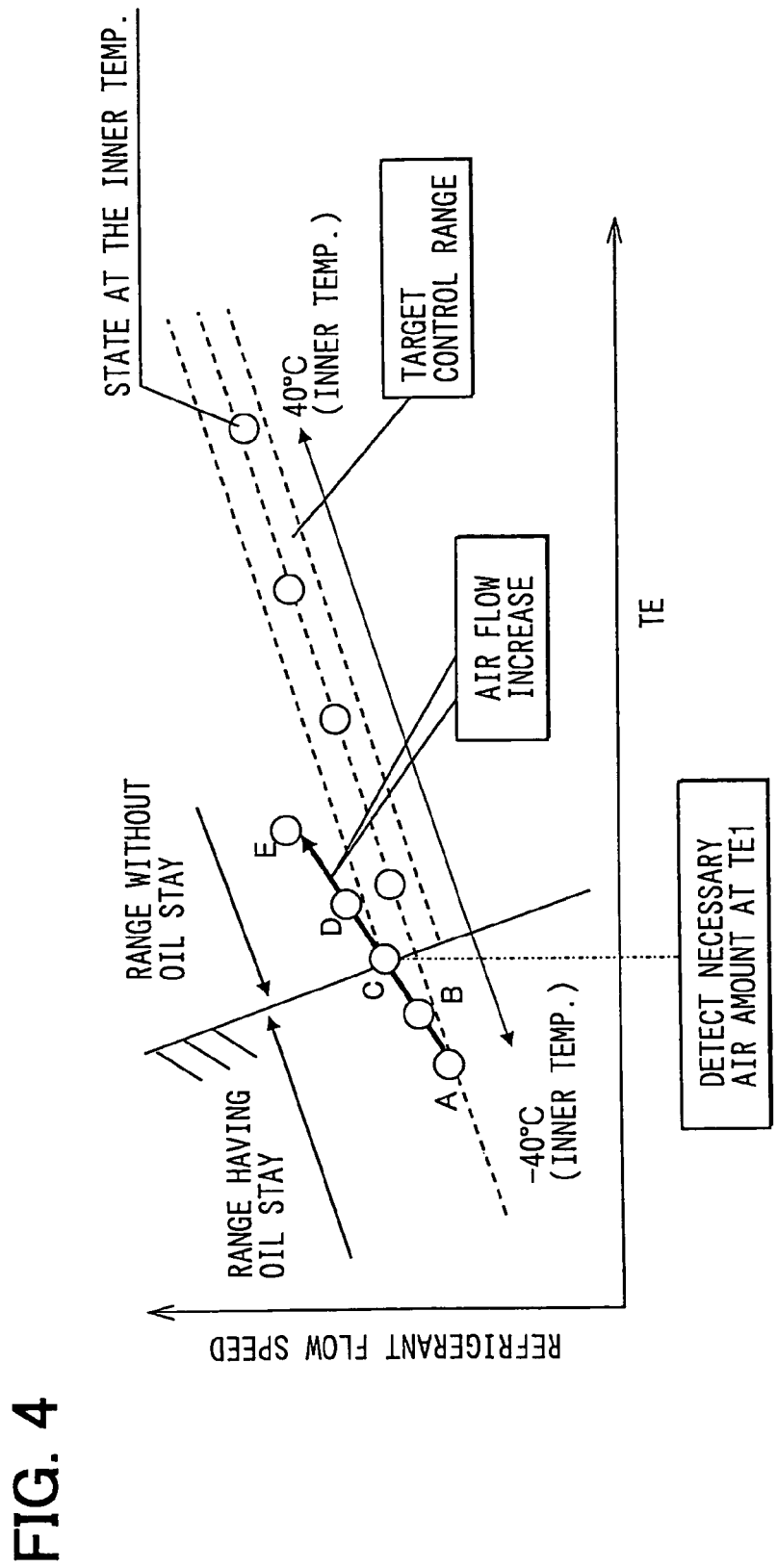
FIG. 4 is a graph for explaining advantages of the first embodiment.

As shown in FIG. 4, the ejector cycle has a range having oil stay and a range without oil stay. Here, in the range having oil stay, a large amount of the lubrication oil stays in the evaporator 30, and a lubrication oil shortage is generated in the compressor 10. By contrast, in the range without oil stay, the amount of the lubrication amount staying in the evaporator 30 is small, and the lubrication oil can be sufficiently supplied to the compressor 10. FIG. 4 shows the range without oil stay in the evaporator 30 and the range having oil stay in the evaporator 30 in the relationship graph between the evaporator refrigerant temperature TE and the refrigerant flow speed in the evaporator 30.

In the first embodiment, the target refrigerant flow speed range where the sufficient amount of the lubrication oil is supplied to the compressor 10, and the target evaporator refrigerant temperature range TEO corresponding to the range without oil stay are stored in the control map. Then, the air amount blown by the evaporator fan 31 is controlled so that the evaporator refrigerant temperature TE is in the target evaporator refrigerant temperature range TEO. That is, the air blowing amount of the evaporator fan 31 is controlled so that the refrigerant flow speed in the evaporator 30 is in the predetermined flow speed range.

The predetermined refrigerant flow speed range where the sufficient amount of the lubrication oil is supplied to the compressor 10, and the target evaporator refrigerant temperature range TEO corresponding to the range without oil stay in the evaporator 30 are obtained by experiments, and are changed in accordance with the outside air temperature TAM and the rotation speed of the compressor 10.

For example, when the evaporator refrigerant temperature TE is lower than a lower limit value of the target evaporator refrigerant temperature range TEO, the air amount blown by the evaporator fan 31 is increased. In this case, the refrigerant temperature TE inside the evaporator 30 increases from the state A in FIG. 4 to the state B→the state C→the state D→the state E, in this order. Accordingly, the refrigerant flow speed in the evaporator increases, and the refrigerant state in the evaporator 30 is moved to the range where sufficient amount of the lubrication oil is supplied to the compressor 10. At the point C of FIG. 4, a necessary air amount blown from the evaporator fan 31 can be detected at the evaporator temperature TE1.

Because the range without oil stay and the range having oil stay are changed in accordance with the rotation speed NC of the compressor and the outside air temperature TAM. Accordingly, in this embodiment, the target evaporator refrigerant temperature range TEO where the sufficient amount of the lubrication oil is supplied to the compressor 10 is calculated in accordance with experiments by using the rotation speed NC of the compressor 10 and the outside air temperature TAM as variable parameters, for example. The target evaporator refrigerant temperature range TEO obtained by the experiments are input to the control map shown at step S7.

Accordingly, the voltage applied to the evaporator fan 31 can be accurately controlled based on the control map so that the refrigerant flow speed in the evaporator 30 is controlled to become in the predetermined flow speed range. Therefore, it can prevent the compressor 10 from being troubled due to an insufficient amount of the lubrication oil.

Second Embodiment

In the above-described first embodiment, the air amount blown by the evaporator fan 31 is controlled by the electronic control unit 70 so as to adjust the refrigerant temperature TE inside the evaporator 30, so that the evaporator refrigerant temperature TE becomes in the target evaporator refrigerant temperature range TEO. That is, the air blowing amount of the evaporator fan 31 is controlled such that the refrigerant flow speed in the evaporator 30 becomes in the predetermined flow speed range. However, in the second embodiment, a refrigerant pressure at the outlet of the nozzle 41, that is, a refrigerant pressure at a suction port of the ejector 40 on the side of the evaporator 30 is adjusted, so that the evaporator refrigerant temperature TE becomes in the target evaporator refrigerant temperature range TEO and the refrigerant flow speed in the evaporator 30 becomes in the predetermined flow speed range.

Figure 5:
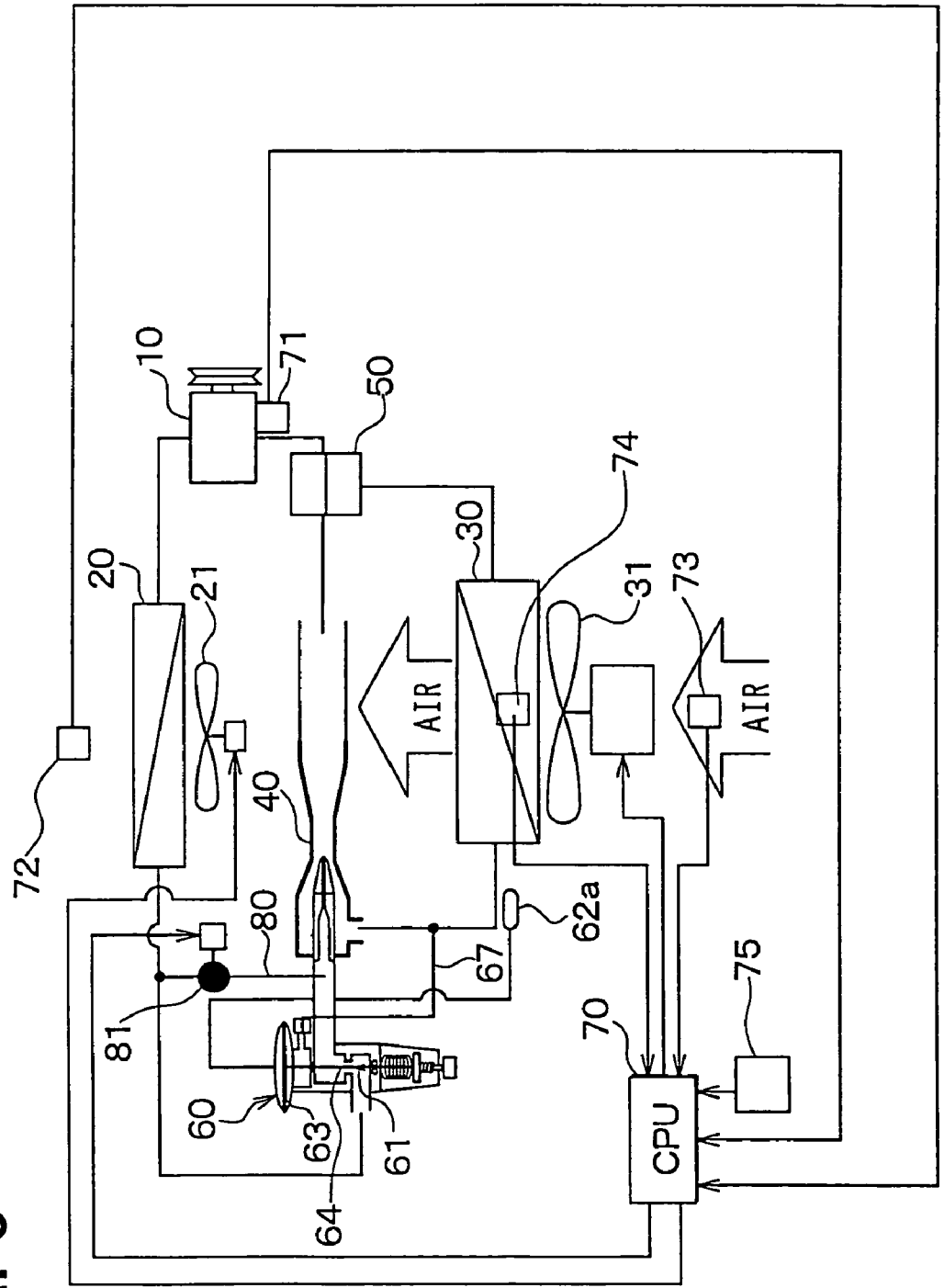
FIG. 5 is a schematic diagram showing an ejector cycle according to a second preferred embodiment of the present invention.

Specifically, as shown in FIG. 5, the ejector cycle has a bypass passage 80 through which at least a part of high-pressure refrigerant discharged from the condenser 20 is directly introduced to the nozzle 41 while bypassing the variable throttle device 60. A valve 81 for opening and closing the bypass passage 80 is provided, and an open degree of the valve 81 is controlled by the electronic control unit 70.

Next, the control operation of the valve 81 according to the second embodiment will be now described with reference to FIG. 6.

Figure 2:
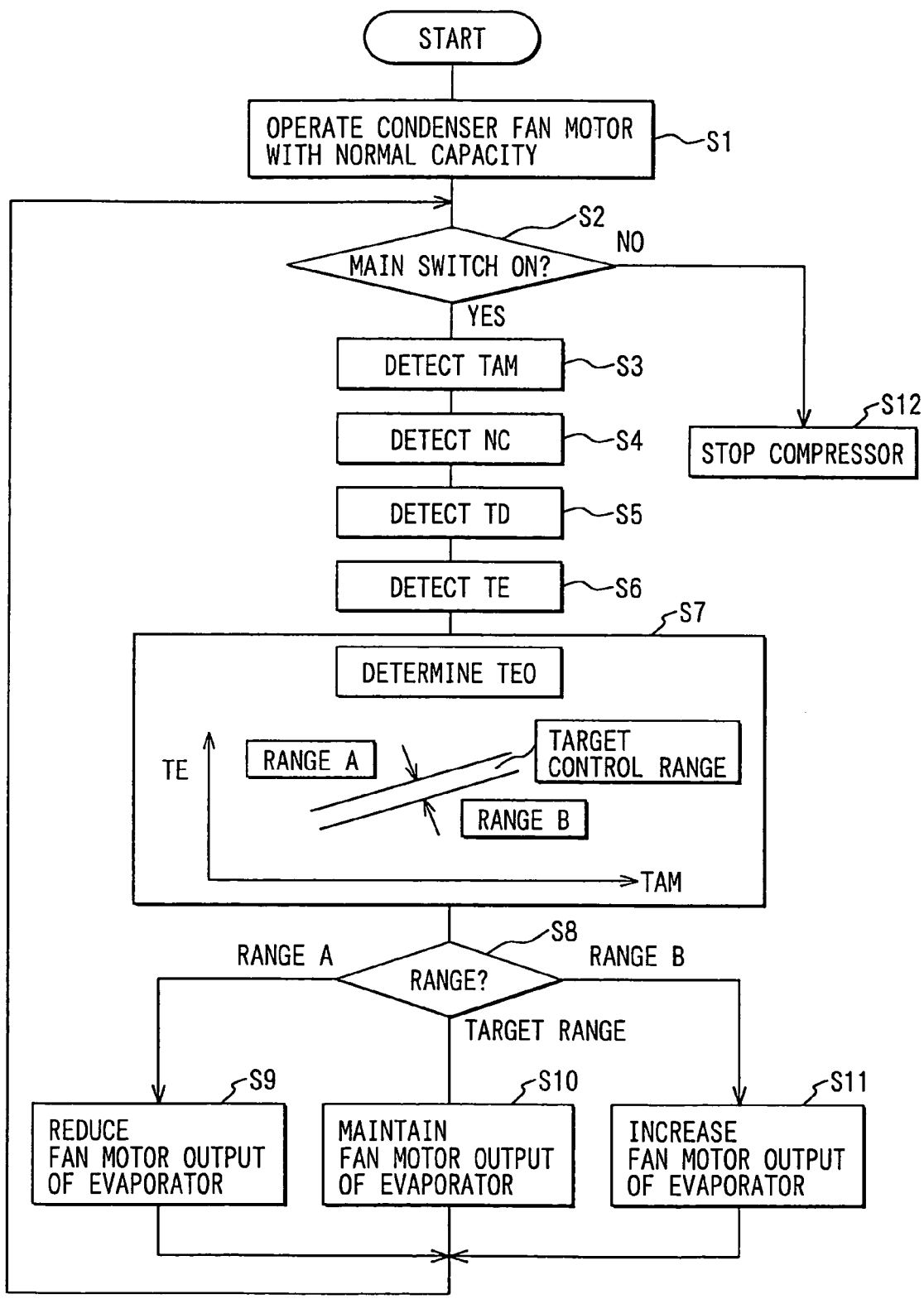
FIG. 2 is a flow diagram showing a control process of the ejector cycle according to the first embodiment.
Figure 6:
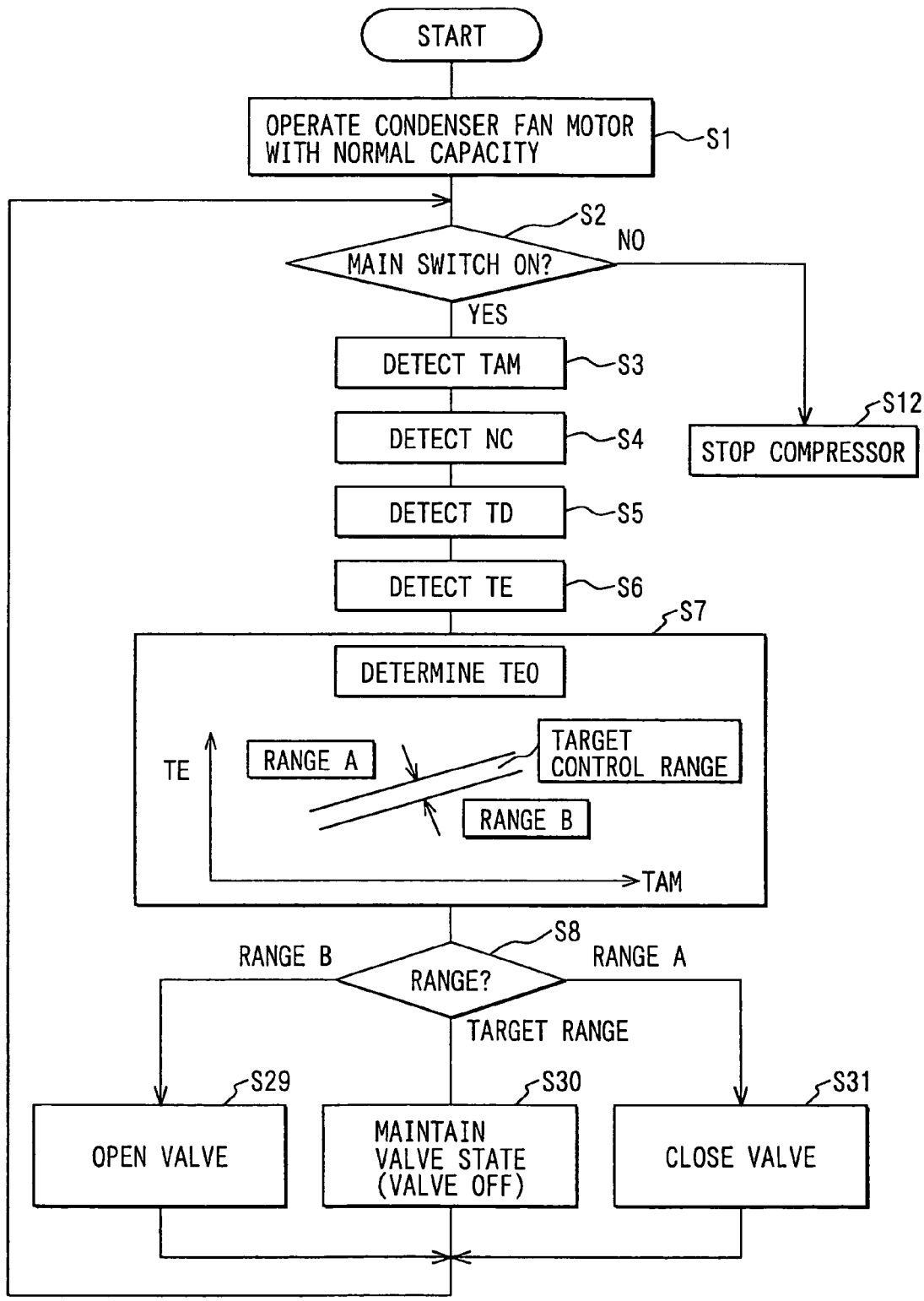
FIG. 6 is a flow diagram showing a control process of the ejector cycle according to the second embodiment.

The flow diagram of the control program shown in FIG. 6 starts when the main switch (start switch) of the control panel 75 is turned on, and the flow diagram of the control program shown in FIG. 2 stops when the main switch (start switch) of the control panel 75 is turned off. At step S1, the condenser fan 21 is operated to blow air toward the condenser 20 by a predetermined air amount (normal capacity, normal output). That is, a voltage applied to the motor of the condenser fan 21 is set at a normal value.

At step S2, it is determined whether or not the main switch of the control panel 75 is turned on. When the main switch of the control panel 75 is turned on at step S2, the outside air temperature (TAM) detected by the outside air temperature sensor 72 is input at step S3, the rotation speed (NC) of the compressor 10 is input at step S3, the air temperature (TD) to be sucked to the evaporator 30 is input at step S5, and the evaporator refrigerant temperature (TE) detected by the evaporator sensor 74 is input at step S6.

Next, at step S7, a target evaporator refrigerant temperature range TEO (predetermined flow speed range) is determined based on at least one of the atmosphere temperature (i.e., outside air temperature TAM) of the condenser 20, the temperature (TD) of air sucked to the evaporator 30, and a flow amount (i.e., rotation speed NC of the compressor 10) of refrigerant discharged from the compressor 10. For example, at step S7, the target evaporator refrigerant temperature range TEO is determined by using the input outside air temperature TAM and the rotation speed NC of the compressor 10 in accordance with a control map stored in the nonvolatile storage device of the electronic control unit 70.

Then, at step S8, it is determined whether or not the evaporator refrigerant temperature TE is in the target evaporator refrigerant temperature range TEO. That is, it is determined whether or not the refrigerant flow speed in the evaporator 30 is in the predetermined flow speed range. When the evaporator refrigerant temperature TE is within the target evaporator refrigerant temperature range TEO, the present state of the valve 81 is maintained at step S30. When the evaporator refrigerant temperature TE is outside the target evaporator refrigerant temperature range TEO, the opening/closing state (switching state) of the valve 81 is controlled so that the evaporator refrigerant temperature TE becomes within the target evaporator refrigerant temperature range TEO, at step S29 and S31. Specifically, when the evaporator refrigerant temperature TE is lower than the lower limit of the target evaporator refrigerant temperature range TEO, that is, when the evaporator refrigerant temperature TE is in the range B on the graph at step S7, the valve 81 is opened so that the refrigerant pressure at the outlet of the nozzle 41 is increased at step S29. In this case, the refrigerant pressure at the suction port of the ejector 40 on the side of the evaporator 30 is increased, the evaporation pressure inside the evaporator 30 is increased, and the evaporator refrigerant temperature TE is increased. Therefore, the refrigerant flow speed in the evaporator 30 is increased to be in the predetermined flow speed range.

In contrast, when the evaporator refrigerant temperature TE is higher than the upper limit of the target evaporator refrigerant temperature range TEO, that is, when the evaporator refrigerant temperature TE is in the range A on the graph at step S7, the valve 81 is closed at step S31 so that the refrigerant pressure at the suction port of the ejector 40 on the side of the evaporator 30 is decreased. In this case, the evaporation pressure inside the evaporator 30 is decreased, and the evaporator refrigerant temperature TE is decreased.

When the main switch of the control panel 75 is turned OFF, the compressor 10 is stopped and the evaporator fan 31 is also stopped, at step S12.

According to the second embodiment of the present invention, when the valve 81 is opened, the high-pressure refrigerant flowing out of the condenser 20 is decompressed only by the nozzle 41. In contrast, when the valve 81 is closed, the high-pressure refrigerant flowing out of the condenser 20 is decompressed in two steps by the variable throttle device 60 and the nozzle 41 of the ejector 40. Therefore, the refrigerant pressure at the outlet of the nozzle 41, that is, the refrigerant pressure at the suction port of the ejector 40 on the side of the evaporator 30 is increased when the valve 81 is opened.

Accordingly, in the second embodiment, the target evaporator refrigerant temperature TEO in which a sufficient amount of the lubrication oil can be supplied to the compressor 10 is determined, and the opening/closing operation of the valve 81 is controlled so that the evaporator refrigerant temperature TE becomes in the target evaporator refrigerant temperature range TEO. That is, the predetermined refrigerant flow speed in the evaporator 30 is determined, and the opening/closing operation of the valve 81 is controlled so that the refrigerant flow speed in the evaporator 30 becomes in the predetermined refrigerant flow speed. Therefore, it can prevent the lubrication oil from becoming insufficient.

In the second embodiment, the opening degree of the valve 81 can be continuously controlled in accordance with the evaporator refrigerant temperature TE. For example, the opening degree of the valve 81 is increased at step S29, and is decreased at step S31.

Further, in the second embodiment, the variable throttle device 60 can be omitted. In this case, a variable nozzle where its throttle open degree is continuously changed is used as the nozzle. For example, the throttle open degree of the nozzle 41 is continuously changed by the electronic control unit 70 so as to control the refrigerant pressure at the suction port of the ejector 40 on the side of the evaporator 30, so that the evaporator refrigerant temperature TE becomes in the target evaporator refrigerant temperature range TEO. That is, the throttle open degree of the nozzle 41 is controlled so that the refrigerant flow speed in the evaporator 30 becomes in the predetermined refrigerant flow speed.

Third Embodiment

Figure 7:
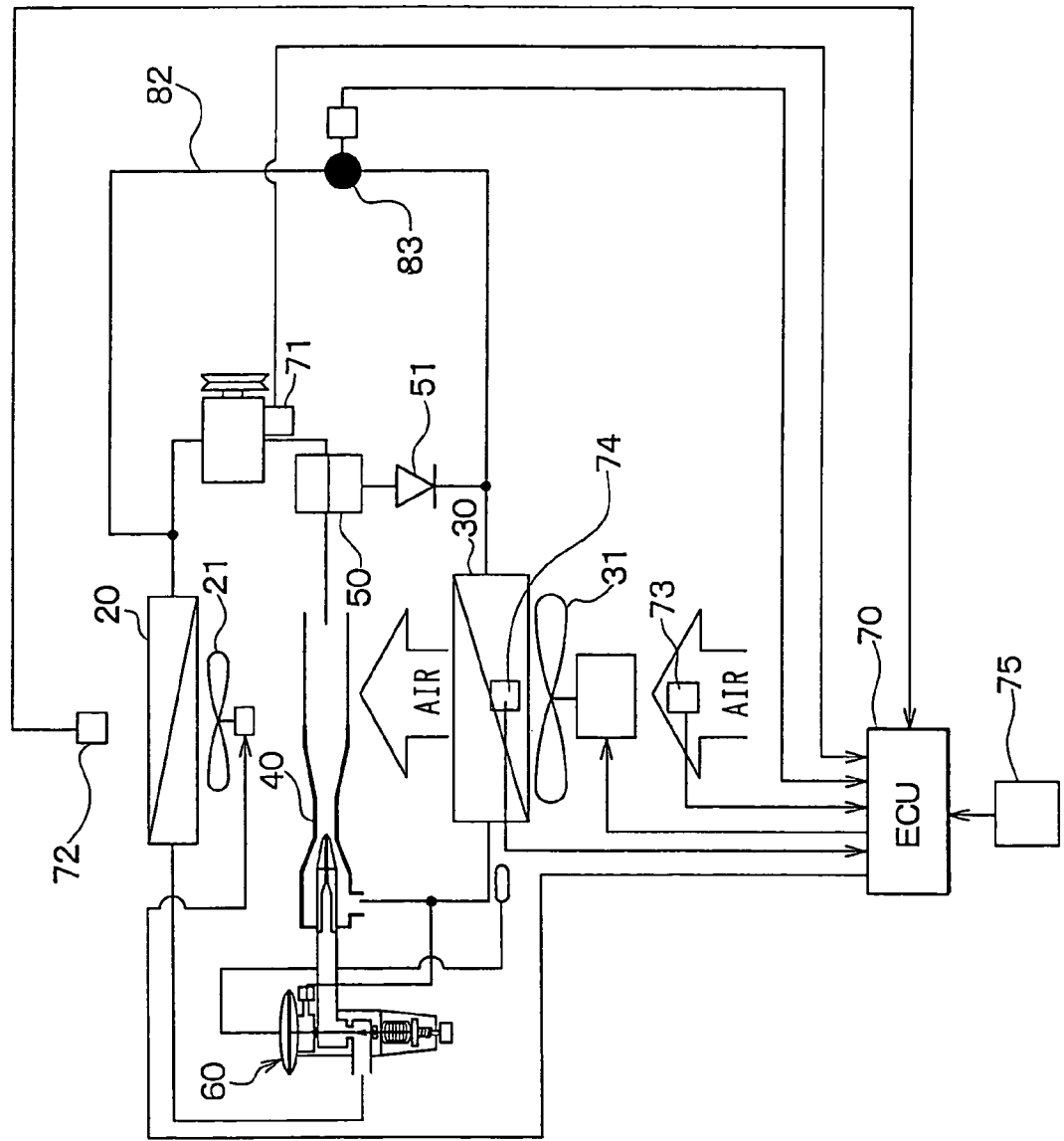
FIG. 7 is a schematic diagram showing an ejector cycle according to a third preferred embodiment of the present invention.

The third embodiment of the present invention will be now described with reference to FIGS. 7 and 8. As shown in FIG. 7, in the third embodiment, the ejector cycle has a bypass passage 82 through which at least a part of the high-pressure refrigerant discharged from the compressor 10 is introduced to the evaporator 30 which bypassing the condenser 20 and the nozzle 41 of the ejector 40. Further, a valve 83 for opening and closing the bypass passage 82 is provided in the bypass passage 82, and the opening/closing operation of the valve 83 is controlled by the electronic control unit 70 so that the refrigerant temperature in the evaporator 30 becomes in the target evaporator refrigerant temperature range TEO. That is, the opening/closing operation of the valve 83 is controlled so that the refrigerant flow speed in the evaporator 30 becomes in the predetermined flow speed range.

A check valve 51 is provided to prevent the high-pressure refrigerant discharged from the compressor 10 from flowing into the gas-liquid separator 50 through the bypass passage 82. Therefore, the check valve 51 only allows a refrigerant flow from the gas-liquid separator 50 toward the evaporator 30.

Next, the control operation of the valve 83 according to the second embodiment will be now described with reference to FIG. 6.

Figure 8:
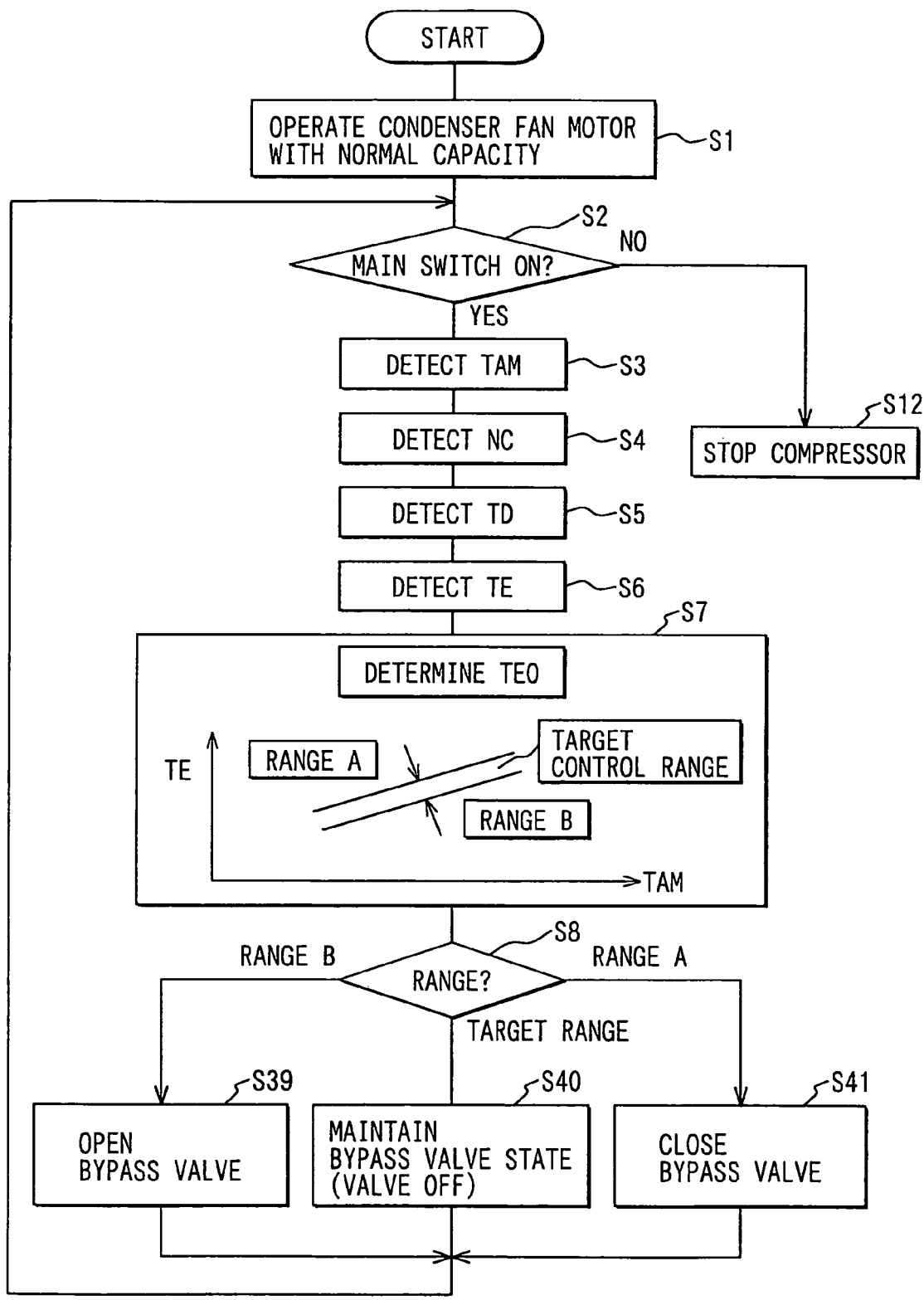
FIG. 8 is a flow diagram showing a control process of the ejector cycle according to the third embodiment.

The flow diagram of the control program shown in FIG. 8 starts when the main switch (start switch) of the control panel 75 is turned on, and the flow diagram of the control program shown in FIG. 2 stops when the main switch (start switch) of the control panel 75 is turned off. At step S1, the condenser fan 21 is operated to blow air toward the condenser 20 by a predetermined air amount (normal capacity, normal output). That is, a voltage applied to the motor of the condenser fan 21 is set at a normal value.

At step S2, it is determined whether or not the main switch of the control panel 75 is turned on. When the main switch of the control panel 75 is turned on at step S2, the temperature (TAM) detected by the outside air temperature sensor 72 is input at step S3, the rotation speed (NC) of the compressor 10 is input at step S3, the air temperature (TD) to be sucked to the evaporator 30 is input at step S5, and the evaporator refrigerant temperature (TE) detected by the evaporator sensor 74 is input at step S6.

Next, a target evaporator refrigerant temperature range TEO (predetermined flow speed range) is determined similarly to the above-described first embodiment. For example, at step S7, the target evaporator refrigerant temperature range TEO (predetermined flow speed range) is determined by using the input outside air temperature TAM and the rotation speed NC of the compressor 10 in accordance with a control map stored in the nonvolatile storage device of the electronic control unit 70.

Then, at step S8, it is determined whether or not the evaporator refrigerant temperature TE is in the target evaporator refrigerant temperature range TEO. When the evaporator refrigerant temperature TE is within the target evaporator refrigerant temperature range TEO, the present state of the valve 83 is maintained at step S40. When the evaporator refrigerant temperature TE is outside the target evaporator refrigerant temperature range TEO, the opening/closing state of the valve 83 is controlled so that the evaporator refrigerant temperature TE becomes within the target evaporator refrigerant temperature range TEO, at step S39 and S41. Specifically, when the evaporator refrigerant temperature TE is lower than the lower limit of the target evaporator refrigerant temperature range TEO, that is, when the evaporator refrigerant temperature TE is in the range B on the graph at step S7, the valve 83 is opened at step S39. In this case, the high-temperature refrigerant discharged from the compressor 10 is introduced into the evaporator 30 through the bypass passage 82, the evaporator refrigerant temperature TE is increased, and the refrigerant flow speed in the evaporator 30 is increased.

In contrast, when the evaporator refrigerant temperature TE is higher than the upper limit of the target evaporator refrigerant temperature range TEO, that is, when the evaporator refrigerant temperature TE is in the range A on the graph at step S7, the valve 83 is closed at step S41. In this case, the evaporation pressure inside the evaporator 30 is decreased, the evaporator refrigerant temperature TE is decreased, and the refrigerant flow speed in the evaporator 30 is decreased.

When the main switch of the control panel 75 is turned OFF, the compressor 10 is stopped, at step S12.

According to the third embodiment of the present invention, when the valve 83 is opened, high-temperature refrigerant (hot gas refrigerant) discharged from the compressor 10 is directly introduced to the evaporator 30 through the bypass passage 82. Therefore, the temperature and the pressure in the evaporator 30 are increased and the refrigerant flow speed in the evaporator 30 is increased. In contrast, when the valve 83 is closed, the temperature and the pressure of the evaporator 30 are decreased and the refrigerant flow speed in the evaporator 30 is decreased.

Accordingly, in the third embodiment, the target evaporator refrigerant temperature TEO in which a sufficient amount of the lubrication oil can be supplied to the compressor 10 is determined, and the opening/closing operation of the valve 83 is controlled so that the evaporator refrigerant temperature TE becomes in the target evaporator refrigerant temperature range. That is, the predetermined flow speed in the evaporator 30 is determined, and the opening/closing operation of the valve 83 is controlled so that the refrigerant flow speed in the evaporator 30 becomes in the predetermined flow speed. Therefore, it can prevent the lubrication oil from becoming insufficient in the compressor 10.

In the third embodiment, the opening degree of the valve 83 can be continuously controlled in accordance with the evaporator refrigerant temperature TE. In this case, the open degree of the valve 83 is increased at step S39, and is decreased at step S41.

In the third embodiment, the bypass passage 82 can be used as a hot gas bypass passage for removing frost on the evaporator 30. For example, when the evaporator 30 is defrosted, high-temperature and high-pressure refrigerant discharged from the compressor 10 is introduced to the evaporator 30 so that frost generated on the outer surface of the evaporator 30 is removed. The pressure of the refrigerant introduced to the evaporator 30 from the bypass passage 82 is controlled to be lower than the resistance pressure of the evaporator 30.

Although the present invention has been fully described in connection with the preferred embodiments thereof with reference to the accompanying drawings, it is to be noted that various changes and modifications will become apparent to those skilled in the art.

For example, in the above-described first and third embodiments of the present invention, the variable throttle device 60 is provided upstream of the nozzle 41 of the ejector 40. However, in the first and third embodiments, the present invention can be applied to an ejector cycle where the variable throttle device 60 is not provided. That is, the present invention can be applied to an ejector cycle where the high-pressure refrigerant from the condenser 20 directly flows into the nozzle 41 of the ejector 40.

In the above-described embodiments of the present invention, the ejector cycle is used for the vapor-compression refrigerator for cooling and refrigerating the foods in the showcase. However, the ejector cycle of the present invention can be used for a vapor-compression refrigerant cycle of an air conditioner, for example.

In the above-described embodiments, an external pressure-equalization thermal expansion valve is used as the variable throttle device 60. However, an internal pressure-equalization thermal expansion valve can be used as the variable throttle device 60.

In the above-described embodiments, the variable throttle device 60 and the nozzle 41 are separately provided. However, the present invention can be applied to an ejector cycle where the variable throttle device 60 and the nozzle 41 are integrated to construct an integrated variable throttle in the ejector 40.

In the above-described embodiments, freon is used as the refrigerant in the ejector cycle. However, the present invention can be applied to an ejector cycle where the other refrigerant such as carbon hydride and carbon dioxide can be used. Further, the present invention can be applied to an ejector cycle where the refrigerant pressure at the high-pressure side is equal to or higher than the critical pressure of the refrigerant. In this case, natural refrigerant such as carbon dioxide can be suitably used.

In the above-described embodiments, the target evaporator refrigerant temperature range TEO is calculated and determined based on the rotation speed of the compressor 10 and the outside air temperature TAM. However, the target evaporator refrigerant temperature range TEO (i.e., the predetermined flow speed range) can be set in a fixed range, or can be determined by the other method. For example, the target evaporator refrigerant temperature range TEO (predetermined flow speed range) is determined based on at least one of the atmosphere temperature of the condenser 20, the air temperature introduced to the evaporator 30, the flow amount of refrigerant discharged from the compressor 10.

In the above-described embodiments, the temperature (e.g., refrigerant temperature TE) of the evaporator 30 is controlled to be within the target evaporator refrigerant temperature range TEO, so that the flow speed of the refrigerant in the evaporator 30 is set in the predetermined flow speed range. However, the present invention is not limited to that. For example, the flow speed of the refrigerant flowing through the evaporator 30 can be directly detected so as to become in the predetermined refrigerant flow range in which the sufficient amount of the lubrication oil can be supplied to the compressor 10.

Further, in the above-described first to third embodiments, the control of the refrigerant flow speed in the evaporator 30 can be performed when the evaporator temperature (e.g., refrigerant temperature TE) is lower than a predetermined temperature.

Such changes and modifications are to be understood as being within the scope of the present invention as defined by the appended claims.

What is claimed is:

1. An ejector cycle using a refrigerant, the ejector cycle comprising:

a compressor for drawing the refrigerant and compressing the refrigerant;

a high-pressure heat exchanger in communication with a discharge outlet of the compressor for cooling the refrigerant discharged from the compressor;

a low-pressure heat exchanger for evaporating the refrigerant after the refrigerant has been decompressed;

a variable throttle device disposed at a refrigerant outlet side of the high-pressure heat exchanger, the variable throttle device having a throttle open degree that is changed in accordance with a super-heating degree on a refrigerant outlet side of the low-pressure heat exchanger;

an ejector disposed in a refrigerant path through which the refrigerant flows from the high pressure heat exchanger to the compressor, the ejector including a nozzle for decompressing and expanding the refrigerant flowing in the refrigerant path from the variable throttle device by converting pressure energy of the refrigerant to speed energy of the refrigerant, and a pressure-increasing portion that is disposed to increase a pressure of the refrigerant by converting the speed energy of the refrigerant to the pressure energy of the refrigerant while mixing the refrigerant jetted from the nozzle and the refrigerant sucked from the low-pressure heat exchanger;

a gas-liquid separator disposed between the ejector and the compressor, the gas-liquid separator in communication with an outlet of the ejector, a suction inlet of the compressor and an inlet of the low-pressure heat exchanger for separating the refrigerant from the ejector into gas refrigerant and liquid refrigerant, the gas-liquid separator having a gas refrigerant outlet coupled to the suction inlet of the compressor, and a liquid refrigerant outlet coupled to the inlet of the low-pressure heat exchanger;

a bypass passage through which at least a part of the refrigerant flowing out of the high-pressure heat exchanger is introduced to the nozzle while bypassing the variable throttle device;

a valve device which opens and closes the bypass passage; and a control unit which controls switching operation of the valve device so that a flow speed of the refrigerant flowing in the low-pressure heat exchanger remains in a predetermined flow speed range, the predetermined flow speed range being set to a flow speed range without an oil stay within the low-pressure heat exchanger; wherein the refrigerant flows in the ejector cycle in this order of the compressor, the high pressure heat exchanger, the ejector and the gas-liquid separator;

the gas refrigerant separated in the gas-liquid separator returning to the compressor without passing through the ejector; and the liquid refrigerant separated in the gas-liquid separator flows in this order of the low-pressure heat exchanger and the ejector.

2. The ejector cycle according to claim 1, further comprising a temperature detecting sensor for detecting a temperature relating to a refrigerant temperature in the low-pressure heat exchanger.

3. The ejector cycle according to claim 1, further comprising:

a refrigerant temperature detecting sensor for detecting a refrigerant temperature in the low-pressure heat exchanger.

4. The ejector cycle according to claim 1, wherein the control unit includes means for determining the predetermined flow speed range based on at least an atmosphere temperature of the high-pressure heat exchanger.

5. The ejector cycle according to claim 1, wherein the control unit includes means for determining the predetermined flow speed range based on at least a temperature of air blown to the low-pressure heat exchanger.

6. The ejector cycle according to claim 1, wherein the control unit includes means for determining the predetermined flow speed range based on at least a flow amount of refrigerant discharged from the compressor.

7. The ejector cycle according to claim 1, wherein:

the control unit includes means for determining the flow speed of the refrigerant based on a refrigerant temperature in the low-pressure heat exchanger.

8. The ejector cycle according to claim 1, further comprising a temperature detecting sensor for detecting a temperature relating to a refrigerant temperature in the low-pressure heat exchanger, wherein the control unit controls the switching operation of the valve device when the temperature detected by the temperature detecting sensor is lower than a predetermined temperature.

9. The ejector cycle according to claim 8, wherein the flow speed of the refrigerant flowing in the low-pressure heat exchanger is determined based on the refrigerant temperature flowing in the low-pressure heat exchanger.

10. The ejector cycle according to claim 1, wherein the control unit includes means for determining the predetermined flow speed range based on at least one of an atmosphere temperature of the high-pressure heat exchanger, a temperature of air blown to the low-pressure heat exchanger, and a flow amount of the refrigerant discharged from the compressor.

11. The ejector cycle according to claim 1, wherein:

the control unit controls the valve device to close the bypass passage when the flow speed is larger than an upper limit of the predetermined flow speed range; and the control unit controls the valve device to open the bypass passage when the flow speed is smaller than a lower limit of the predetermined flow speed range.

12. The ejector cycle according to claim 1, wherein:

the control unit decreases an open degree of the variable throttle device when the flow speed is larger than an upper limit of the predetermined flow speed range; and the control unit increases the open degree of the variable throttle device when the flow speed is smaller than a lower limit of the predetermined flow speed range.

13. The ejector cycle according to claim 1, wherein the control unit sets the predetermined flow speed range such that an oil stay is not caused in the predetermined flow speed.

14. The ejector cycle according to claim 1, wherein the ejector is disposed in the refrigerant path through which the refrigerant flows from the high pressure heat exchanger to the gas-liquid separator and then to the compressor; the nozzle of the ejector is located to decompress and expand the refrigerant flowing through the refrigerant path.

15. The ejector cycle according to claim 1, wherein the bypass passage is connected to an upstream portion of the nozzle of the ejector.

16. The ejector cycle according to claim 1, wherein one end of the bypass passage is connected to a portion between the high-pressure heat exchanger and the variable throttle device, and the other end of the bypass passage is connected to a portion between the variable throttle device and the nozzle of the ejector.

* * * * *